(12) United States Patent
Su

(10) Patent No.: US 9,706,849 B2
(45) Date of Patent: Jul. 18, 2017

(54) FASTENING STRUCTURE FOR FOOTREST RING OF CHAIR

(71) Applicant: Chih-Cheng Su, Dongguan (CN)

(72) Inventor: Chih-Cheng Su, Dongguan (CN)

(73) Assignee: DONGGUAN KENTEC OFFICE SEATING CO., LTD., Dongguan (CN)

( * ) Notice: Subject to any disclaimer, the term of this patent is extended or adjusted under 35 U.S.C. 154(b) by 0 days.

(21) Appl. No.: 15/396,764

(22) Filed: Jan. 2, 2017

(65) Prior Publication Data
US 2017/0105534 A1 Apr. 20, 2017

Related U.S. Application Data

(63) Continuation-in-part of application No. 14/845,277, filed on Sep. 4, 2015, now Pat. No. 9,578,969.

(51) Int. Cl.
*A47C 7/52* (2006.01)
*A47C 7/00* (2006.01)
*F16B 12/10* (2006.01)

(52) U.S. Cl.
CPC ............... *A47C 7/52* (2013.01); *A47C 7/004* (2013.01); *F16B 12/10* (2013.01)

(58) Field of Classification Search
CPC ............. A47C 7/50; A47C 7/52; A47C 7/506
USPC ... 297/344.18, 344.22, 423.24, 423.4, 423.1, 297/423.25, 423.38, 451.5, 463.2, 440.1, 297/440.13, 463.1
See application file for complete search history.

(56) References Cited

U.S. PATENT DOCUMENTS

| 3,458,234 | A | * | 7/1969 | Bates | A47C 7/50 248/125.1 |
| 3,820,844 | A | * | 6/1974 | Fortnam | A47C 7/52 297/240 |
| 4,948,149 | A | * | 8/1990 | Lin | A63B 61/02 403/104 |
| 5,470,038 | A | * | 11/1995 | Clark | A45B 5/00 248/156 |
| 5,988,754 | A | * | 11/1999 | Lamart | A47C 7/506 248/161 |
| 6,578,804 | B2 | * | 6/2003 | Lin | A47C 7/004 248/188.1 |
| 7,229,054 | B2 | * | 6/2007 | Hu | A47C 7/004 248/188.1 |
| 7,452,034 | B2 | * | 11/2008 | Jung | A47C 7/004 248/188.7 |
| 8,297,563 | B2 | * | 10/2012 | Tsai | A47C 7/004 248/125.1 |
| 8,517,472 | B1 | * | 8/2013 | Proctor | A47C 7/50 297/423.1 |
| 8,931,848 | B2 | * | 1/2015 | Archambault | B60N 3/063 297/423.25 |
| 8,991,928 | B2 | * | 3/2015 | Hsieh | A47C 7/004 297/344.19 |

(Continued)

*Primary Examiner* — Brian Glessner
*Assistant Examiner* — Adam Barlow

(57) ABSTRACT

The fastening structure includes an inner sleeve, a quick-release handle and an outer sleeve. The inner sleeve has an outer threaded conic surface, a through slot, shrinkable slots and claw plates between adjacent two of the shrinkable slots. The quick-release handle is provided at a bottom end of the inner sleeve for controlling a width of the through slot. The outer sleeve is used for connecting the footrest ring and has an inner threaded conic surface to screw the outer sleeve onto the inner sleeve.

7 Claims, 8 Drawing Sheets

(56) References Cited

U.S. PATENT DOCUMENTS

| | | | |
|---|---|---|---|
| 9,144,315 B1* | 9/2015 | Cheng | A47C 7/506 |
| 9,220,346 B1* | 12/2015 | Wu | A47C 7/506 |
| 9,254,041 B2* | 2/2016 | Kessler | A47C 7/004 |
| 2006/0175518 A1* | 8/2006 | Hu | A47C 7/004 248/425 |
| 2007/0290541 A1* | 12/2007 | Tsai | A47C 7/52 297/423.1 |
| 2010/0201177 A1* | 8/2010 | Moore | A47C 7/52 297/423.25 |
| 2014/0070592 A1* | 3/2014 | Yeh | A47C 7/004 297/423.38 |
| 2014/0265512 A1* | 9/2014 | Pritchard | A47C 7/506 297/423.38 |

* cited by examiner

FASTENING STRUCTURE FOR FOOTREST RING OF CHAIR

CROSS-REFERENCE TO RELATED APPLICATIONS

This application is a continuation-in-part of U.S. patent application Ser. No. 14/845,277 filed Sep. 4, 2015, now pending.

BACKGROUND OF THE INVENTION

1. Technical field

The invention relates to chairs, particularly to a chair with a footrest.

2. Related Art

Office chairs with a cushion elevation mechanism and/or flexible back have been very popular. Many chairs are provided with a flexible back with tilt flexibility to satisfy various requirements of users. Although existing chairs are very comfortable for users, almost all office chairs do not provide a footrest for supporting a user's feet to relax a user's his or her legs.

Even if some office chairs provide a footrest, but the position of the footrest cannot be adjusted or is hard to be adjusted. Users with different height need different positions of the footrest. A user will feel uncomfortable if the footrest cannot be set a proper position.

The parent application of the present invention discloses a fastening structure with a quick-release mechanism. Although the quick-release mechanism can shrink a slotted the inner sleeve to firmly hold a chair post of chair, it merely can provide a limited shrunk variation because there is only one through slot in the inner sleeve. Therefore, the inward holding pressure provided by the inner sleeve is not good enough.

SUMMARY OF THE INVENTION

An object of the invention is to provide a fastening structure for a footrest ring of a chair, which provides the inner sleeve better holding pressure against the central post.

To accomplish the above object, the fastening structure for a footrest ring of a chair of the invention includes an inner sleeve, a quick-release handle and an outer sleeve. The inner sleeve has an outer threaded conic surface, a through slot, shrinkable slots and claw plates between adjacent two of the shrinkable slots. The quick-release handle is provided at a bottom end of the inner sleeve for controlling a width of the through slot. The outer sleeve is used for connecting the footrest ring and has an inner threaded conic surface to screw the outer sleeve onto the inner sleeve.

DETAILED DESCRIPTION OF THE INVENTION

Figure 1:
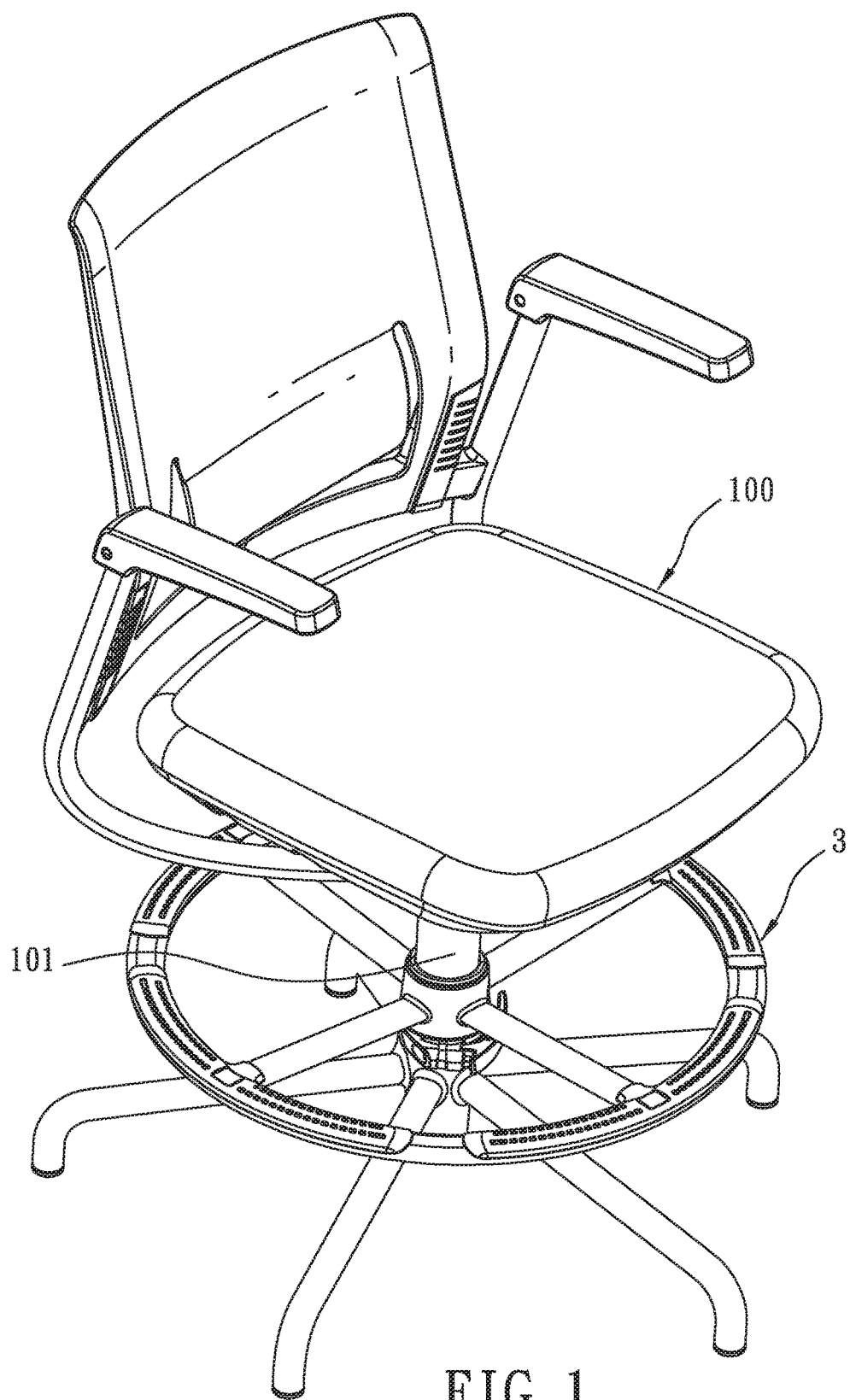
FIG. 1 is a schematic view of the invention assembled with a chair.
Figure 2:
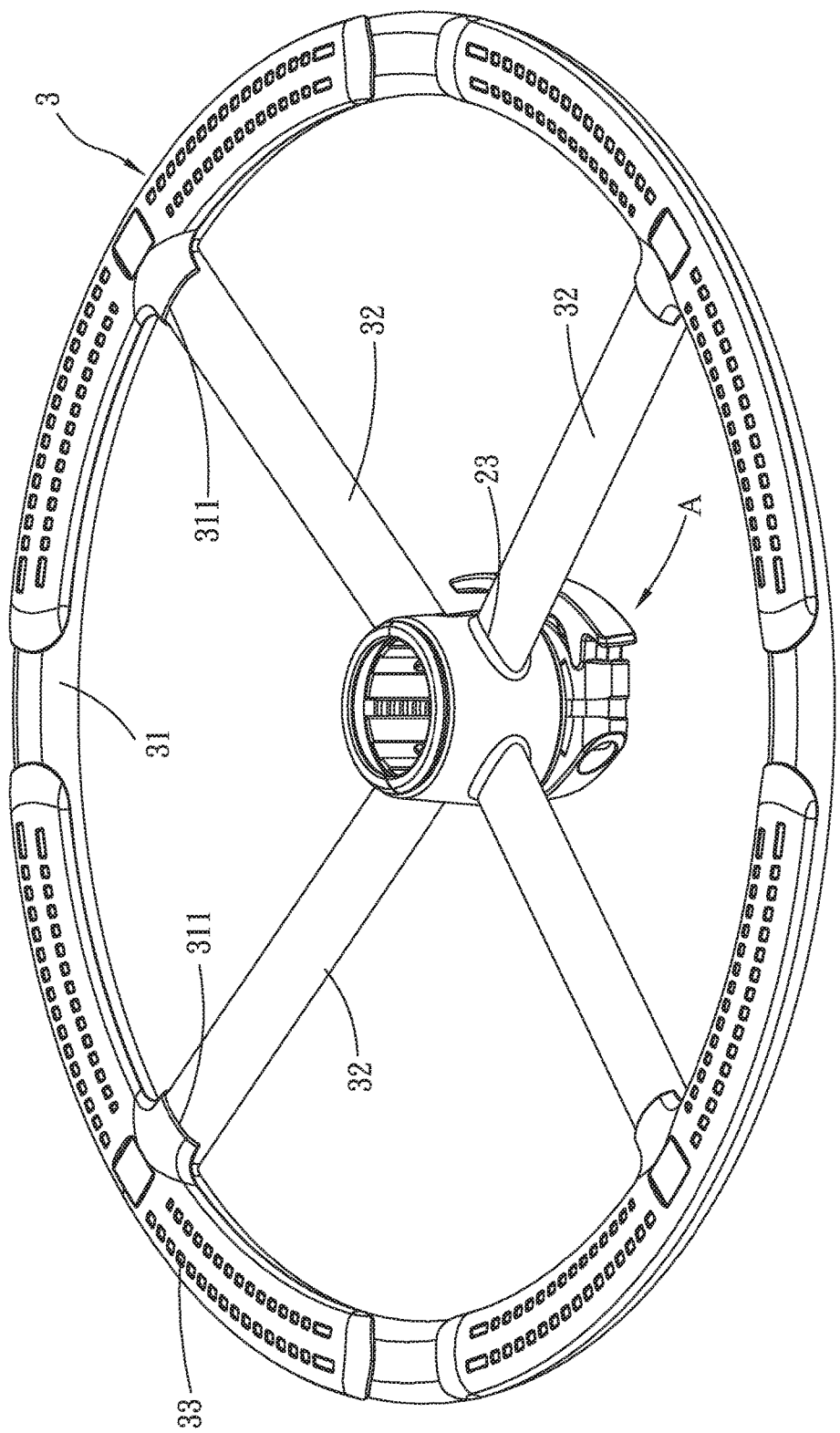
FIG. 2 is an assembled view of the invention and a footrest: ring.
Figure 3:
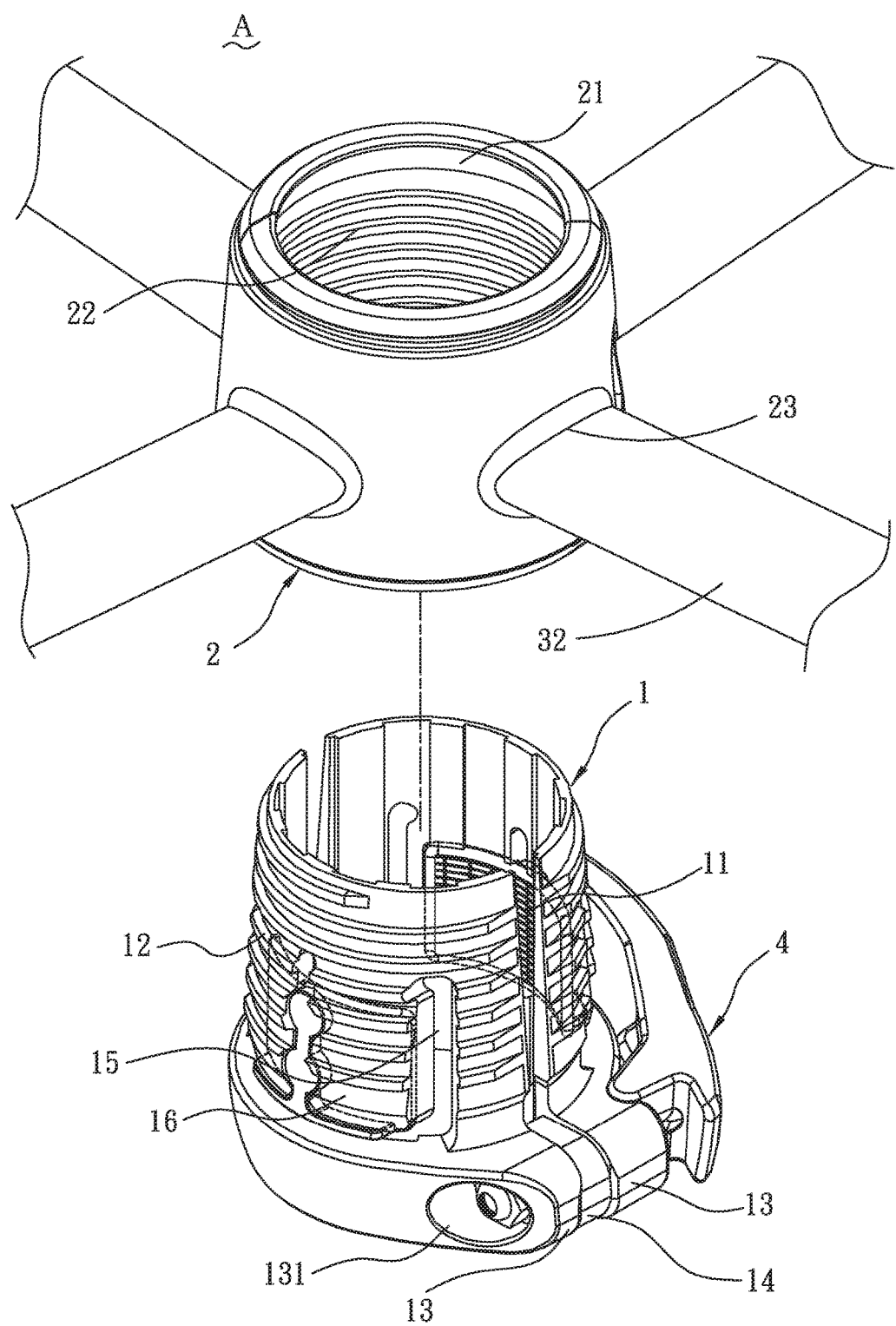
FIG. 3 is an exploded view of the footrest ring.
Figure 4:
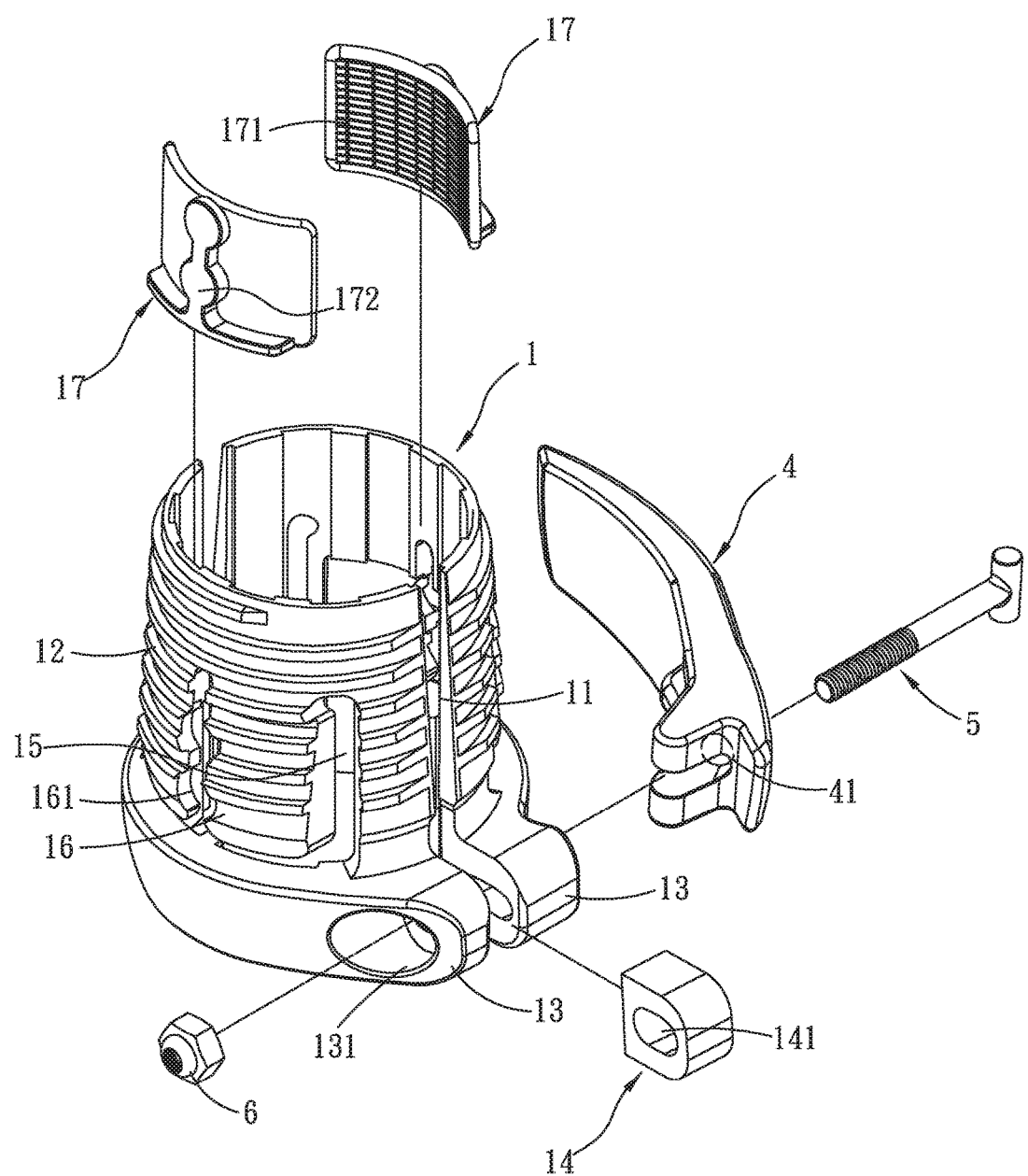
FIG. 4 is an exploded view of the invention.
Figure 5:
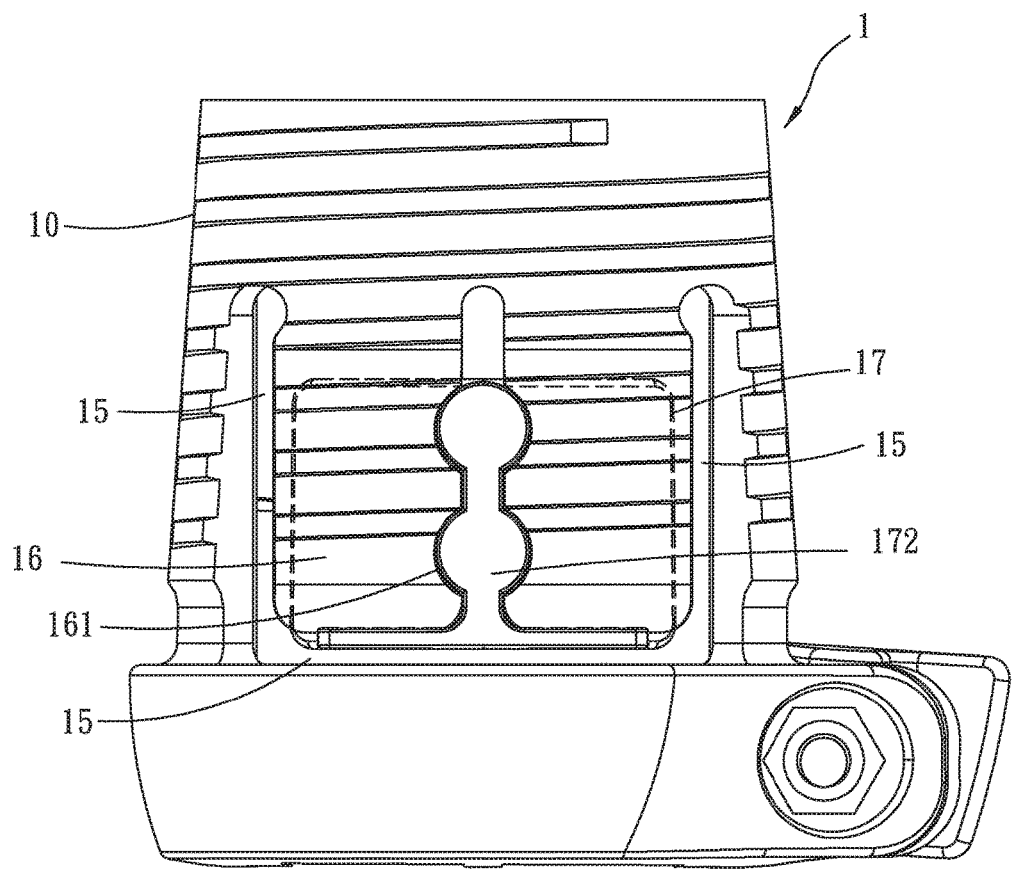
FIG. 5 is a side view of the invention.

Please refer to FIG. 1. As shown, the footrest ring 3 of the invention is installed onto a central post 101 of a chair 100. The fastening structure A, as shown in FIG. 2, is used for fixing the footrest ring 3 onto the central post 101. As shown in FIGS. 3-5, the fastening structure A includes an inner sleeve 1, a quick-release handle 4 and an outer sleeve 2. The inner sleeve 1 is used for being put around the central post 101. An outer threaded conic surface 10 with an outer thread 12 is formed on the inner sleeve 1. The inner sleeve 1 has a through slot 11 so as to make the inner sleeve 1 have a C-shape cross-section. The bottom end of the inner sleeve 1 is provided with two protrudent latch portions 13 separately beside the through slot 11. Each of the latch portions 13 is formed with a passing hole 131. Thus the inner sleeve 1 can normally keep its original shape or be forcedly shrunken when the through slot 11 is pressed by the latch portions 13.

The quick-release handle 4 is formed with a through hole 41 at an end thereof. The through hole 41 corresponds to the passing holes 131 for being passed through by a bolt 5. The bolt 5 passes through the through hole 41 and the passing holes 13 to screw with an anti-release nut 6 for connecting the quick-release handle 4 onto the inner sleeve 1. The inner sleeve 1 can be fastened to the central post 101 by rotating and closing the quick-release handle 4 to shrink the through slot 11. Preferably, a buffer pad 14 is disposed between the latch portions 13. The buffer pad 14 is formed with a corresponding hole 141 corresponding to the passing hole 131 for being passed by the bolt 5. The buffer pad 14 can prevent the latch portions 13 from directly touching.

The outer threaded conic surface 10 is formed with multiple longitudinal shrinkable slots 15. A claw plate 16 is formed between two adjacent shrinkable slots 15. Preferably, an inner side of the claw plate 16 is further provided with a clamping pad 17 with anti-slip lines 171, The clamping pad 17 is made of rubber or plastic. Additionally, the claw plate 16 is formed with a fixing hole 161, and the clamping pad 17 is formed with an engagement portion 172 corresponding to the fixing hole 161 in shape and position so that the engagement portion 172 can be embedded in the fixing hole 161 to fasten the clamping pad 17.

The outer sleeve 2 is used for connecting the footrest ring 3. An inner threaded conic surface 21 with an inner thread 22 corresponding to the outer thread 12 of the inner sleeve 1 is formed inside the outer sleeve 2 so as to be able to screw the outer sleeve 2 onto the inner sleeve 1. Because of the conic shapes of the threaded surfaces 12, 21, the outer sleeve 2 can be firmly screwed onto the inner sleeve 1. Moreover, the claw plates 16 are also shrunk inward to form a clamping force to enhance clamping stability between the inner sleeve 1 and the central post 101. Additionally, the clamping pads 17 are sandwiched between the claw plates 16 and the central post 101 so as to prevent friction and wear therebetween.

Please refer to FIGS. 2 and 3. The footrest ring 3 includes a metal ring body 31 which connects to outer ends of the support rods 32 and anti-slip pads 33 on the ring body 31. The ring body 31 is provided with first positioning holes 311 for being inserted by the support rods 21. The support rods 32 are fastened to the outer sleeve 21 by separately inserting the support rods 21 into second positioning holes 23 in the outer sleeve 21. Thus the footrest ring 3 can be connected to the outer sleeve 2 and each of the support rods 32 may be individually replaced.

Figure 6:
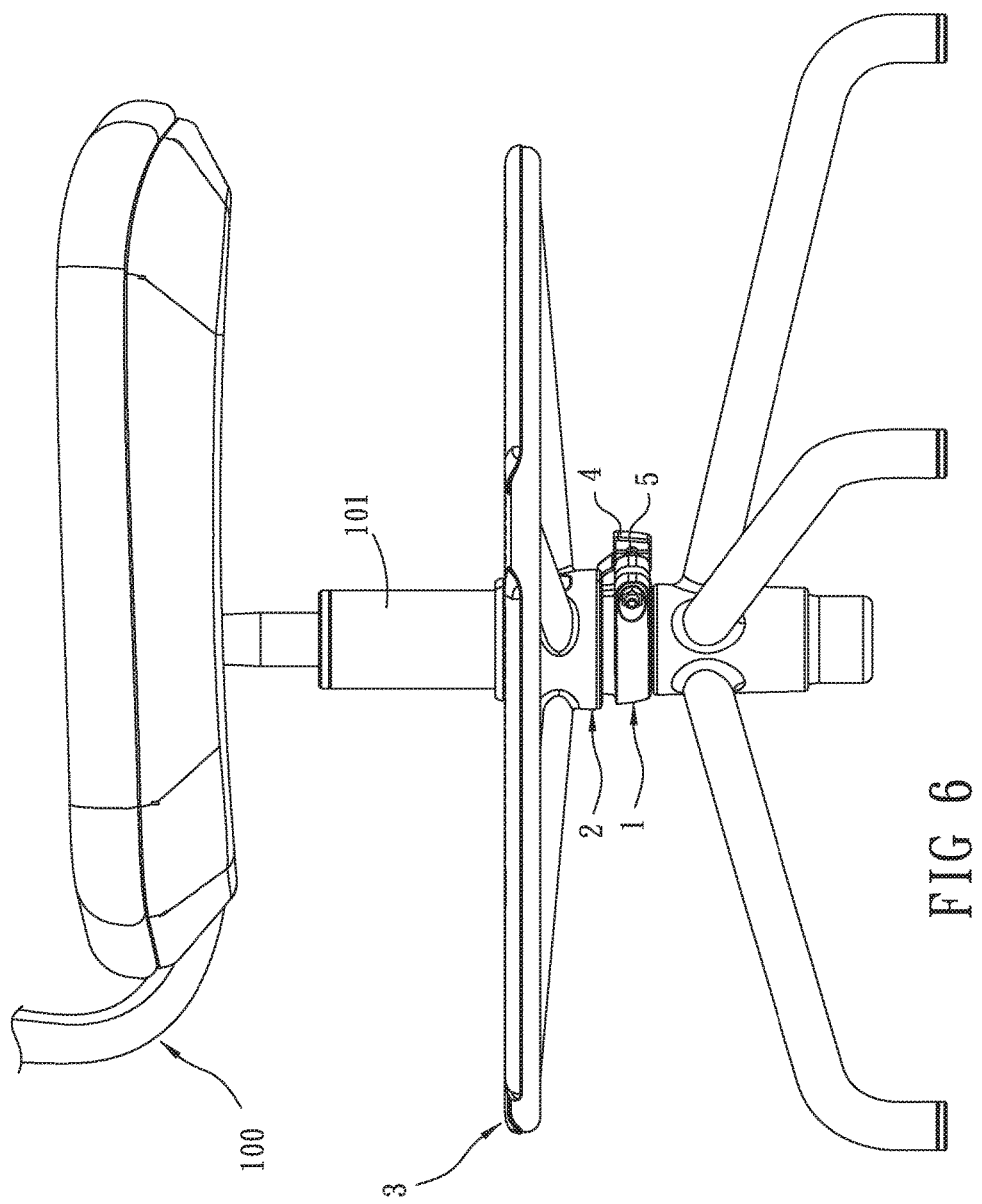
FIG. 6 is a side view of the invention assembled in a chair.
Figure 7:
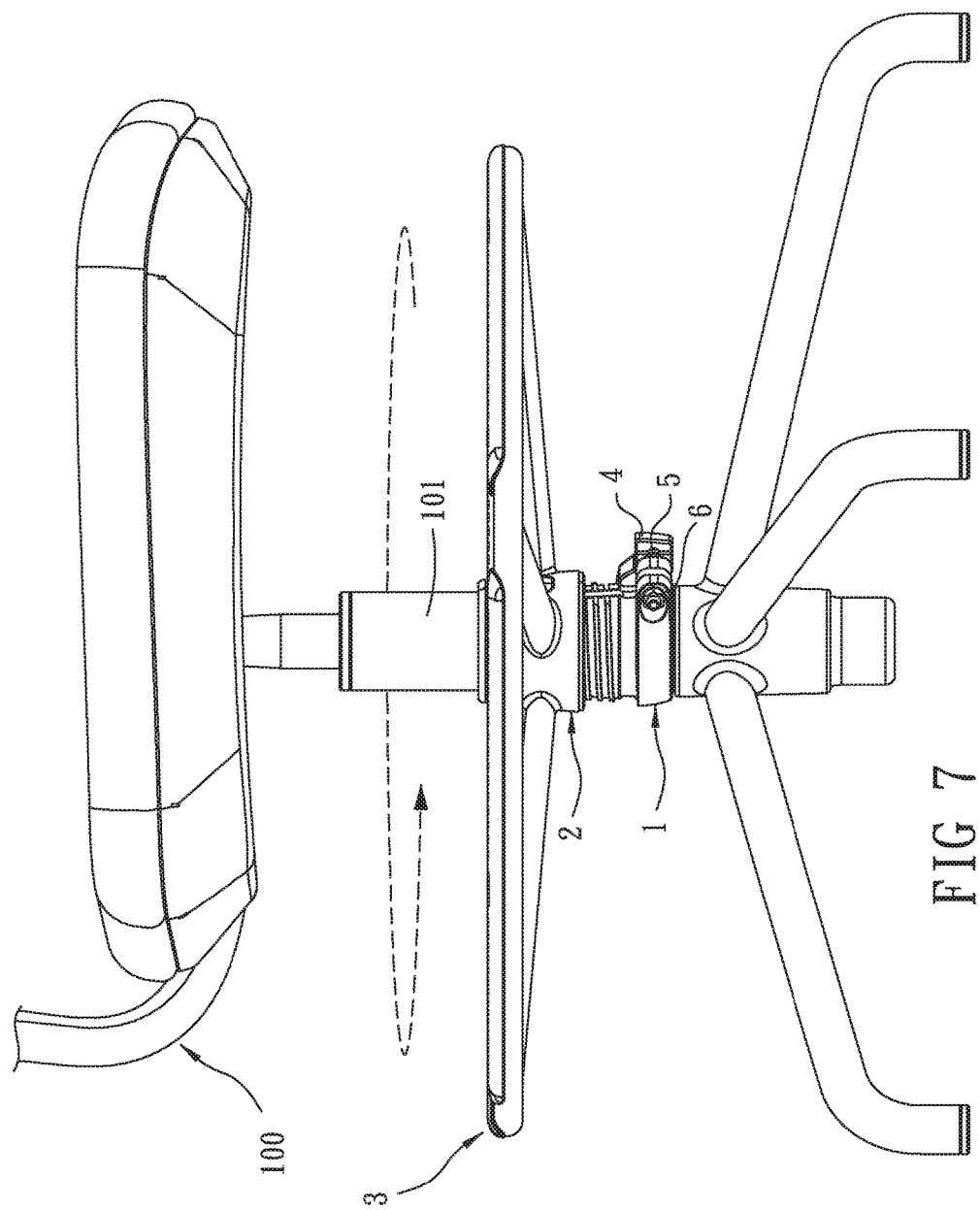
FIG. 7 is a schematic view of the invention showing the footrest ring to be changed.
Figure 8:
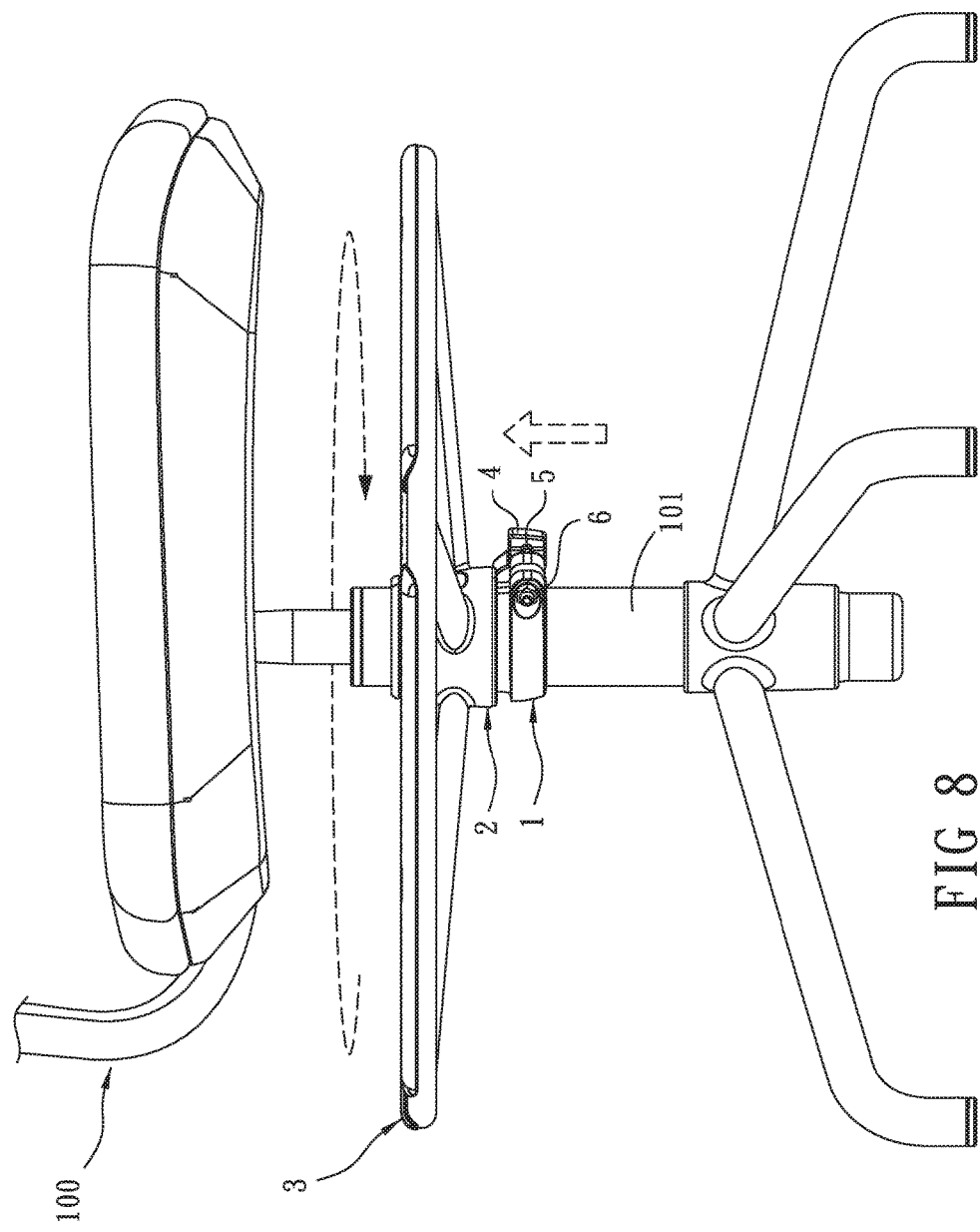
FIG. 8 is a schematic view he invention showing the footrest ring which has finished position shift.

Please refer to FIGS. 6-8. The footrest ring 3 of the invention is fastened around a central post 101 of a chair 100 by pressing down the quick-handle 4 so that the inner sleeve 1 cannot be moved any longer. The outer sleeve 2 is fastened onto the inner sleeve 1 by screwing the inner and outer threaded surfaces 12, 13 as shown in FIG. 6.

When a user wants to adjust the position of the footrest ring 3 against the central post 101, as shown in FIG. 7, rotate the ring body 31 to loosen the outer sleeve 2 with respect to the inner sleeve 1 and open the quick-release handle 4, such that the inner sleeve 1 can be slid along the central post 101. As shown in FIG. 8, when the footrest ring 3 has been moved to a desired position, close the quick-release handle 4 and screw up the outer sleeve 2 with the inner sleeve 1 to re-position the footrest ring 3.

What is claimed is:

1. A fastening structure for a footrest ring of a chair, comprising:
    an inner sleeve, having an outer threaded conic surface formed thereon, having a through slot, shrinkable slots and claw plates between any adjacent two of the shrinkable slots;
    a quick-release handle, provided at a bottom end of the inner sleeve for controlling a width of the through slot; and
    an outer sleeve used for connecting the footrest ring, having an inner threaded conic surface formed therein so as to screw the outer sleeve onto the inner sleeve.

2. The fastening structure of claim 1, wherein a bottom end of the inner sleeve is provided with two protrudent latch portions separately beside the through slot, each of the latch portions is formed with a passing hole, the quick-release handle is formed with a through hole at an end thereof, and the through hole corresponds to the passing holes for being passed through by a bolt.

3. The fastening structure of claim 2, wherein a buffer pad is disposed between the two latch portions, and the buffer pad is formed with a corresponding hole corresponding to the passing hole for being passed by the bolt.

4. The fastening structure of claim 1, wherein an inner side of each of the claw plates is provided with a clamping pad with anti-slip lines.

5. The fastening structure of claim 4, wherein the claw plate is formed with a fixing hole, and the clamping pad is formed with an engagement portion corresponding to the fixing hole in shape and position so that the engagement portion is embedded in the fixing hole to fasten the clamping pad.

6. The fastening structure of claim 1, further comprising support rods, wherein an end of each of the support rods is connected to the outer sleeve.

7. The fastening structure of claim 6, wherein the footrest ring is provided with first positioning holes for being separately inserted by the support rods, and the support rods are fastened to the outer sleeve by separately inserting the support rods into second positioning holes in the outer sleeve.

* * * * *